United States Patent [19]
Sato et al.

[11] Patent Number: 5,475,077
[45] Date of Patent: Dec. 12, 1995

[54] METHOD FOR THE PREPARATION OF DIORGANOPOLYSILOXANE END-BLOCKED WITH SILANOLIC HYDROXY GROUPS

[75] Inventors: Makoto Sato; Masaaki Furuya; Masao Maruyama, all of Gunma, Japan

[73] Assignee: Shin-Etsu Chemical Co., Ltd., Tokyo, Japan

[21] Appl. No.: 661,160

[22] Filed: Feb. 27, 1991

[51] Int. Cl.$^6$ .................................................. C08G 77/06
[52] U.S. Cl. ................... 528/14; 528/23; 528/37
[58] Field of Search ........................... 528/14, 37, 23

[56] References Cited

U.S. PATENT DOCUMENTS

| | | | |
|---|---|---|---|
| 4,448,927 | 5/1984 | Falender et al. | 528/23 |
| 4,482,670 | 11/1984 | Saam et al. | 528/23 |
| 4,710,558 | 12/1987 | Jira et al. | 528/37 |
| 4,780,519 | 10/1988 | Saam et al. | 528/14 |
| 4,888,405 | 12/1989 | Gamon et al. | 528/14 |

OTHER PUBLICATIONS

Dean (ed.), Handbook of Chemistry, 13th ed., pp. 10–82 and 10–83.
International Encyclopedia of Chemical Science, D. Van Nostrand Company, p. 340.
Budavari (ed.), The Merck Index, 11th ed., Merck & Co., Inc. (1989), pp. 120, 124, 129.

Primary Examiner—John C. Bleutge
Assistant Examiner—Karen A. Dean
Attorney, Agent, or Firm—Millen, White, Zelano, & Branigan

[57] ABSTRACT

A silanol-terminated diorganopolysiloxane can be reproducibly imparted with a viscosity as desired by the alkali-catalyzed ring-opening or siloxane rearrangement reaction from a cyclic or linear-chain diorganosiloxane oligomer by conducting, instead of exactly controlling the water content in the starting reaction mixture as in the prior art method, the reaction at least in the latter stage thereof under a controlled water-vapor pressure until neutralization of the alkali catalyst after equilibrium of the reaction has been reached according to the discovery that the viscosity or degree of polymerization of the silanol-terminated diorganopolysiloxane is a function of the water-vapor pressure, under which the reaction is brought into equilibrium, at the respective temperature.

10 Claims, 1 Drawing Sheet

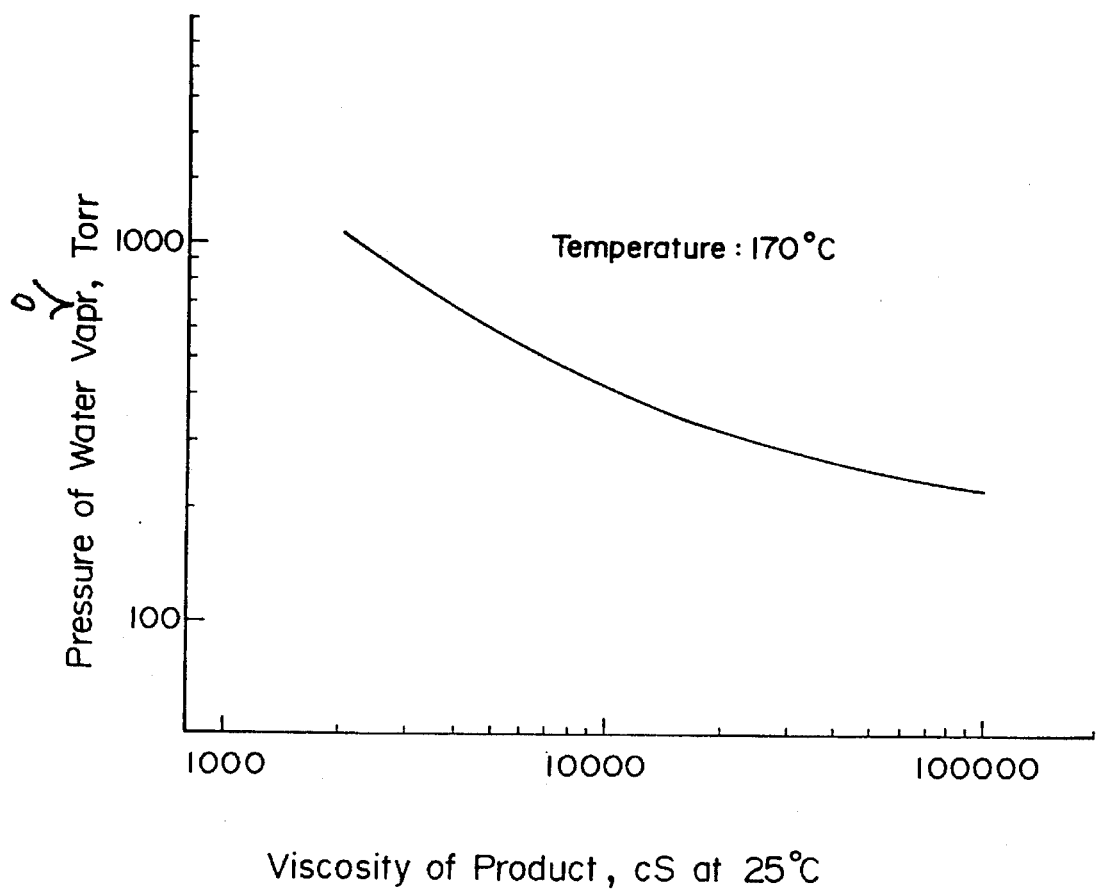
FIGURE

METHOD FOR THE PREPARATION OF DIORGANOPOLYSILOXANE END-BLOCKED WITH SILANOLIC HYDROXY GROUPS

BACKGROUND OF THE INVENTION

The present invention relates to a method for the preparation of a diorganopolysiloxane blocked at each molecular chain end with a silanolic hydroxy group or, more particularly, to a method by which a diorganopolysiloxane end-blocked with silanolic hydroxy groups and having a desired viscosity can be easily and reproducibly prepared leaving little hydrolyzable groups even from inexpensive starting materials.

As is well known, diorganopolysiloxanes blocked at each molecular chain end with a silanolic hydroxy group are widely used, for example, as a base ingredient of room temperature-curable silicone rubber compositions. In the prior art, diorganopolysiloxanes blocked at each molecular chain end with a silanolic hydroxy group are prepared by a method described below. Namely, the starting material in the conventional method is a cyclic diorganosiloxane oligomer, such as octamethyl cyclotetrasiloxane, and the diorganosiloxane oligomer is first subjected to a pretreatment for dehydration or drying as completely as possible by stripping under reduced pressure or by blowing dry nitrogen gas into the liquid oligomer at an elevated temperature prior to the ring-opening polymerization reaction to equilibrium in the presence of an alkali catalyst. In the next place, the thus dehydrated diorganosiloxane oligomer is admixed with an exactly controlled amount of water and an alkali catalyst and the mixture is heated at a specified temperature for a specified length of time to effect the ring-opening polymerization reaction until equilibrium is established followed by neutralization of the alkali catalyst and stripping of the low molecular-weight constituents and other volatile matters therein to give a diorganopolysiloxane blocked at each molecular chain end with a silanolic hydroxy group and having a desired viscosity or degree of polymerization. It is important in this process that an exactly controlled amount of water is contained in the oligomer before the polymerization reaction because the viscosity or degree of polymerization of the diorganopolysiloxane obtained by the reaction is determined by the content of water or the molar ratio of the water to the diorganosiloxane units in the oligomer in the reaction mixture.

It is of course possible in this prior art method that an undehydrated or incompletely dehydrated cyclic diorganosiloxane oligomer or a linear-chain diorganosiloxane oligomer having silanolic hydroxy groups at the molecular chain ends is used as the starting material. It is essential in this case, however, that the content of the residual water or the amount of the silanolic hydroxy groups relative to the amount of the diorganosiloxane units is exactly controlled in order that the resulting diorganopolysiloxane product may have a desired viscosity.

Another problem in the above described prior art method is that the type of the terminal groups at the molecular chain ends of the diorganopolysiloxane product is influenced when the starting diorganosiloxane oligomer contains hydrolyzable functional groups besides the silanol groups.

As is understood from the above description, the prior art method for the preparation of a silanol-terminated diorganopolysiloxane has disadvantages because the process as a whole is complicated or lengthy and requires utmost carefulness for exactly controlling the contents of water or silanol groups in the starting materials or elimination of functional groups other than silanol groups in the starting materials sometimes resulting in a poorly reproducible quality of the products and an increase in the production costs.

SUMMARY OF THE INVENTION

The present invention accordingly has an object to provide a convenient and reliable method for the preparation of a diorganopolysiloxane of reproducible quality terminated at each molecular chain end with a silanolic hydroxy group and having a reproducibly controlled viscosity with little content of residual hydrolyzable groups from an inexpensive starting material by the so-called siloxane rearrangement reaction so as to overcome the above described problems and disadvantages in the prior art method which is conducted in a lengthy and troublesome process and requires utmost carefulness.

Thus, the method of the present invention for the preparation of a diorganopolysiloxane terminated at each molecular chain end with a silanolic hydroxy group represented by the general formula

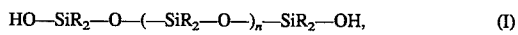
$$\text{HO}-\text{SiR}_2-\text{O}-(-\text{SiR}_2-\text{O}-)_n-\text{SiR}_2-\text{OH}, \tag{I}$$

in which R is an unsubstituted or substituted monovalent hydrocarbon group and the subscript n is a positive integer, comprises the steps of:

(a) adding an alkaline compound as a catalyst to a cyclic diorganosiloxane oligomer represented by the general formula

$$[-\text{SiR}_2-\text{O}-]_x, \tag{II}$$

in which R has the same meaning as defined above and the subscript x is a positive integer in the range from 3 to 6, a diorganosiloxane oligomer of a linear molecular structure represented by the general formula

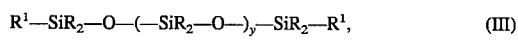
$$R^1-\text{SiR}_2-\text{O}-(-\text{SiR}_2-\text{O}-)_y-\text{SiR}_2-R^1, \tag{III}$$

in which R has the same meaning as defined above, $R^1$ is a hydroxy group or a hydrolyzable group and the subscript y is a positive integer, or a mixture thereof to form a reaction mixture;

(b) heating the reaction mixture in the presence of water to effect the siloxane rearrangement reaction under a controlled pressure of water vapor until an equilibrium is established; and (c) neutralizing the alkaline compound under the controlled pressure of water vapor.

BRIEF DESCRIPTION OF THE DRAWING

The FIGURE is a graphic showing of the relationship between the water-vapor pressure in step (b) and the viscosity of the dimethylpolysiloxane terminated at each molecular chain end with a silanolic hydroxy group as prepared at 170° C. according to the inventive method.

DETAILED DESCRIPTION OF THE PREFERRED EMBODIMENTS

As is understood from the above given description, the most characteristic feature of the inventive method consists in step (b) in which the starting diorganosiloxane oligomer with admixture of an alkali catalyst and water is heated under a controlled water-vapor pressure, which pressure is selected in accord with the desired viscosity of the diorganopolysiloxane product of the general formula (I), until the equilibrium in the siloxane rearrangement reaction is established. When this unique measure is undertaken, it is no longer necessary that the content of water or hydroxy and/or hydrolyzable groups in the diorganosiloxane oligomer as the starting material is exactly controlled depending on the desired viscosity of the product. In other words, the present invention proposes a very simple and convenient means to obtain a silanol-terminated diorganopolysiloxane having a desired viscosity by merely controlling the water-vapor pressure under which the siloxane rearrangement reaction is conducted and brought into equilibrium in place of the troublesome measure of exactly controlling the content of water and/or hydroxy groups in the starting materials taking a large labor and time.

The starting material used in the inventive method is a diorganosiloxane oligomer which may have a cyclic or linear molecular structure as expressed by the above given general formulas (II) and (III), respectively. A cyclic oligomer and a linear oligomer can be used in combination. In the formulas (II) and (III), the symbol R denotes an unsubstituted or substituted monovalent lower hydrocarbon group exemplified by alkyl groups such as methyl, ethyl, propyl and butyl groups, alkenyl groups such as vinyl and allyl groups and aryl groups such as phenyl and tolyl groups as well as those substituted groups obtained by replacing a part or all of the hydrogen atoms in the above named hydrocarbon groups with halogen atoms, cyano groups and the like such as chloromethyl, 2-cyanoethyl and 3,3,3-trifluoropropyl groups. The symbol $R^1$ in the general formula (III) denotes a hydroxy group or a hydrolyzable group which may be an alkoxy group, e.g., methoxy and ethoxy groups, or a chlorine atom bonded to the terminal silicon atom. The subscript x is the degree of polymerization of the Cyclic oligomer and has a value in the range from 3 to 6 although this upper limit is not particularly limitative but is given by the practical reason that a cyclic oligomer having a degree of polymerization larger than 6 is hardly obtained. The subscript y is a positive integer which is not particularly limitative but it is of course that, when a linear oligomer alone is used as the starting material, the value of y as an average differs from the value of n which specifies the average degree of polymerization of the diorganopolysiloxane product represented by the general formula (I).

These diorganosiloxane oligomers can be prepared according to a method well established in the art of silicone products from a diorgano dichlorosilane or a mixture of diorgano dichlorosilanes by the (co)hydrolysis or (co)alcoholysis reaction followed by the silanol condensation or dealcoholation condensation reaction. The thus obtained product is usually a mixture of several different kinds of diorganosiloxane oligomers and can be used as such as the starting material. The product also usually contains a small amount of water but, advantageously, it is not always necessary in the inventive method that the water-containing diorganosiloxane oligomer is subjected to a dehydration treatment beforehand as in the prior art method.

In step (a) of the inventive method, the above described diorganosiloxane oligomer or a mixture of oligomers is admixed with an alkaline compound as the catalyst for the siloxane rearrangement reaction. Alkaline compounds suitable as the catalyst are well known in the prior art and include, for example, hydroxides and silanolates of alkali metals such as sodium and potassium. The amount of the alkaline compound added to the reaction mixture as the catalyst is usually in the range from 50 to 500 ppm by weight based on the amount of the diorganosiloxane oligomer as the starting material. When the amount of the alkaline compound is too small, the velocity of the reaction would be unduly decreased. When the amount thereof is too large, on the other hand, a correspondingly large amount of salt is formed in the reaction mixture in the succeeding step (c) for the neutralization of the alkaline compound to cause a difficulty in the removal of the precipitated salt.

The diorganosiloxane oligomer as the starting material with admixture of an alkali catalyst is heated in a hermetically sealable vessel to effect the siloxane rearrangement reaction. The temperature of heating is in the range from 50° to 250° C. or, preferably, from 150° to 200° C. When a diorganosiloxane oligomer of a linear molecular structure is used as the starting material and at least a part of the end groups denoted by $R^1$ are hydrolyzable groups such as alkoxy groups, it is advantageous that the temperature is 170° C. or higher in order to facilitate concurrent hydrolysis and removal of the hydrolyzable groups. The length of time for this heating treatment is usually from 20 minutes to 2 hours although the exact length of time depends on the temperature. For example, 30 minutes of the heating time would be sufficient at a temperature of 170° C. Namely, the hydrolyzable groups are readily hydrolyzed by the water introduced into the reaction mixture to form a silanolic hydroxy groups at the molecular chain ends and the hydrolysis product, e.g., an alcohol from alkoxy groups, is dissipated out of the reaction mixture as being carried by the water vapor. The amount of water here introduced into the reaction mixture should be sufficient so that the amount of the diorganopolysiloxane distilled out as being carried by the water vapor is at least 15% by weight based on the total amount of the diorganosiloxane oligomers used as the starting material. When the amount of water introduced into the mixture is too small not to carry out a sufficient amount of the siloxane as the distillate, removal of the hydrolyzable groups would be incomplete. The diorganopolysiloxane distilled out of the reaction mixture can be discarded but it would be advantageous that the distillate is returned to the reaction mixture after stripping of the hydrolysis products such as an alcohol from alkoxy groups or hydrogen chloride from chlorine atoms.

In step (b) of the inventive method, the starting reaction mixture containing the alkaline compound as the catalyst is heated in the presence of water while the pressure of water vapor above the reaction mixture is controlled at a value corresponding to the desired viscosity of the diorganopolysiloxane product until an equilibrium of the siloxane rearrangement reaction is established. It is not always necessary that the pressure of water vapor is controlled throughout the heating procedure but the pressure is controlled for some length of time just before the termination of the reaction at equilibrium. For example, the reaction is performed first under an uncontrolled or atmospheric pressure for several hours and then the vessel is closed and the pressure inside the vessel is controlled at a desired value for 30 minutes to establish the equilibrium. It is optional according to need that an additional amount of the alkali catalyst is introduced into the reaction mixture prior to heating under a controlled water-vapor pressure.

As is mentioned before, it is an unexpected discovery that the silanol-terminated diorganopolysiloxane prepared by the siloxane rearrangement reaction has a definite viscosity when heating of the reaction mixture is conducted under a controlled water-vapor pressure as mentioned above regardless of the content of water and/or hydroxy groups in the starting diorganosiloxane oligomers provided that the content thereof is adequate assuming a definite reaction temperature. Namely, the viscosity of the silanol-terminated diorganopolysiloxane product is a function of the water-vapor pressure and temperature in the siloxane rearrangement reaction so that the viscosity of the product can be reproducibly controlled by merely controlling the water-vapor pressure under which the reaction is undertaken at a definite temperature.

The figure of the accompanying drawing graphically shows the viscosity at 25° C. of the silanol-terminated dimethylpolysiloxane product obtained by the reaction carried out at 170° C. as a function of the water-vapor pressure under which the reaction is brought into equilibrium. It is understood from the graph that a silanol-terminated dimethylpolysiloxane having a viscosity of up to 100,000 centistokes at 25° C. can be prepared by controlling the water-vapor pressure during the reaction in the range from 200 Torr to 10 kg/cm$^2$.

When the starting reaction mixture of the diorganosiloxane oligomer or oligomers contains a large amount of water and/or hydroxy groups and the reaction is conducted in a closed vessel at a specified temperature, the pressure inside the vessel would exceed the target pressure so that it is necessary that the vessel is communicated with an evacuation system so as to bring the pressure in the gaseous phase into the target pressure determined by the temperature and the desired viscosity of the silanol-terminated diorganopolysiloxane product. When the content of water and/or hydroxy groups in the starting reaction mixture is too small, on the other hand, a corresponding amount of water either as liquid or as steam is introduced into the reaction vessel so as to increase the pressure up to the target value. It is desirable in this case that the gaseous space inside the reaction vessel is filled entirely with water vapor alone by excluding other gases. This is because presence of a gas other than water vapor in the atmosphere brings a bias into the value of pressure as determined with a pressure gauge necessitating a correction of the value of pressure as determined in order to obtain the true value of the water-vapor pressure which must be the target pressure. Otherwise, some unreliableness would be included in the determination of the water-vapor pressure resulting in eventually decreased reproducibility of the viscosity of the silanol-terminated diorganopolysiloxane products from run to run. A convenient method for removing gases other than water vapor is to add an excessive amount of water to the reaction mixture and the water is evaporated off the mixture carrying the gases other than water vapor before the reaction mixture is kept under a controlled water-vapor pressure. When the diorganosiloxane oligomer used as the starting material has hydrolyzable groups, the hydrolysis product of the hydrolyzable groups can be also removed simultaneously along with purging of the gases other than water vapor.

As is mentioned before, it is not always necessary that the reaction mixture is heated under a controlled water-vapor pressure throughout the heating time but it is usually sufficient that the water-vapor pressure is controlled only during some length of time before the reaction is terminated and the alkali catalyst is neutralized. For example, the reaction under a controlled water-vapor pressure reaches equilibrium usually within 10 minutes to 2 hours or, in most cases, within 30 minutes to 1 hour. No additional advantages could be obtained by further extending the reaction time over the above mentioned upper limit. The reaction temperature is in the range from 50° to 200° C.

When the reaction has reached equilibrium under a controlled water-vapor pressure, the alkali catalyst in the reaction mixture is neutralized by adding a neutralizing agent, such as an acid, to be deactivated. It is important here that the controlled water-vapor pressure above the reaction mixture is maintained as such until complete deactivation of the catalyst since otherwise a shift is caused in the equilibrium point corresponding to the altered water-vapor pressure so that the product may not have an exact viscosity as desired. After completion of neutralization of the alkali catalyst, the reaction mixture is freed from the precipitates of the salt formed by the neutralization of the alkali catalyst and then stripped of the volatile material including the low molecular-weight constituents in the equilibrated reaction mixture under reduced pressure so that a silanol-terminated diorganopolysiloxane having a desired viscosity can be obtained.

Although the description above was given for the process of preparing a silanol-terminated diorganopolysiloxane having a linear molecular structure, the principle of the inventive method is of course applicable to any silanol-terminated organopolysiloxane such as those having a three-dimensional molecular structure comprising a small amount of trifunctional and tetrafunctional siloxane units.

In the following, the method of the present invention is illustrated in more detail by way of examples, in which the terms of "parts" and "%" always refer to "parts by weight" and "% by weight", respectively.

EXAMPLE 1

Into a reaction vessel equipped with a stirrer, condenser with a liquid receiver and jacket for heating medium were introduced 900 parts of a mixture of cyclic dimethylsiloxane oligomers mainly composed of the trimer, tetramer and pentamer as prepared by the hydrolysis of dimethyl dichlorosilane and the temperature thereof was controlled at 170° to 175° C. The thus heated mixture in the vessel was admixed with 1.08 parts of a 8.3% aqueous solution of potassium hydroxide and agitated for 30 minutes at the same temperature so as to effect the ring-opening polymerization of the oligomers. Thereafter, steam was blown into the thus polymerized reaction mixture in the vessel for 2 hours at a rate of 30 parts per hour so as to replace the air and other gases in the vessel with water vapor. The reaction vessel was then closed and the reaction mixture therein was kept for further 30 minutes at 170° C. under a pressure of 315 Torr followed by the introduction of ethylene chlorohydrin as a neutralizing agent and removal of the potassium salt formed by the neutralization and precipitated in the mixture. The thus obtained oily reaction product was stripped of the volatile matter under reduced pressure to give 780 parts of a silanol-terminated dimethylpolysiloxane having a viscosity of 22,500 centistokes at 25° C.

EXAMPLE 2

Into a reaction vessel equipped with a stirrer, condenser with a liquid receiver and jacket for heating medium were introduced 540 parts of a mixture of cyclic dimethylsiloxane oligomers and 360 parts of a linear-chain dimethylpolysiloxane having an average degree of polymerization of about 80 and terminated at each molecular chain end mainly with a silanol group, of which the content of the methoxy groups was 280 ppm by weight, and the temperature of the mixture was controlled at 170° to 175° C. The thus heated mixture in the vessel was admixed with 1.08 parts of a 8.3% aqueous solution of potassium hydroxide and agitated for 30 minutes at the same temperature so as to effect copolymerization of the cyclic and linear-chain oligomers by the ring-opening and siloxane rearrangement reactions. Thereafter, water was continuously introduced dropwise into the thus polymerized reaction mixture in the vessel over 3 hours at a rate of 30 parts per hour so as to replace the air and other gases in the vessel with water vapor along with removal of methyl alcohol formed by the hydrolysis of the methoxy groups in the starting linear-chain oligomer until the amount of the organosiloxane oligomer in the distillate had reached 142 parts. The content of the residual methoxy groups as the hydrolyzable groups was found to have been decreased to 10 ppm by weight or smaller.

The reaction vessel was then closed and the reaction mixture therein was kept for further 30 minutes at 170° C. under a pressure of 330 Torr followed by the introduction of ethylene chlorohydrin as a neutralizing agent and removal of the potassium salt formed by the neutralization and precipitated in the mixture. The thus obtained oily reaction product was stripped of the volatile matter under reduced pressure to give 656 parts of a silanol-terminated dimethylpolysiloxane having a viscosity of 21,400 centistokes at 25° C. with good reproducibility.

EXAMPLE 3

The procedure was substantially the same as in Example 2 except that the reaction mixture before neutralization of the alkaline catalyst was kept at 170° C. for 30 minutes under a pressure of 430 Torr instead of 330 Torr. The resulting silanol-terminated dimethylpolysiloxane had a viscosity of 11,500 centistokes at 25° C.

EXAMPLE 4

The procedure was substantially the same as in Example 2 except that reaction mixture after the polymerization reaction was admixed with water dropwise at a rate of 30 parts per hour over 30 minutes instead of 3 hours and the reaction mixture before neutralization of the alkali catalyst was kept at 170° C. for 30 minutes under a pressure of 640 Torr instead of 330 Torr. The resulting silanol-terminated dimethylpolysiloxane had a viscosity of 4,070 centistokes at 25° C.

EXAMPLE 5

A reaction mixture composed of the same amounts of the same cyclic and linear-chain dimethylsiloxane oligomers as used in Example 2 and heated at 175° to 185° C. was admixed with 0.9 part of a 10% aqueous solution of potassium silanolate to effect the polymerization reaction for 30 minutes at the same temperature. While the thus polymerized reaction mixture was kept at the same temperature, water was continuously added dropwise to the mixture at a rate of 10 parts per hour. The content of the methoxy groups as the hydrolyzable groups in the reaction mixture was decreased to 20 ppm by weight and to 10 ppm by weight or smaller when the amount of the siloxane oligomers in the distillate amounted 71.5 parts and 140.5 parts, respectively.

The reaction vessel was then closed and the reaction mixture therein was kept for further 30 minutes at 170° C. under a pressure of 315 Torr followed by the introduction of ethylene chlorohydrin as a neutralizing agent and removal of the potassium salt formed by the neutralization and precipitated in the mixture. The thus obtained oily reaction product was stripped of the volatile matter under reduced pressure to give 660 parts of a silanol-terminated dimethylpolysiloxane having a viscosity of 22,300 centistokes at 25° C. with good reproducibility.

What is claimed is:

1. A method for the preparation of a diorganopolysiloxane terminated at each molecular chain end with a silanolic hydroxy group represented by the general formula $$HO—SiR_2—O—(—SiR_2—O—)_n—SiR_2—OH,$$

in which R is an unsubstituted or substituted monovalent hydrocarbon group and the subscript n is a positive integer, which comprises the steps of:

(a) adding an alkaline compound as a catalyst to starting materials to form a reaction mixture, said starting materials being selected from the group consisting of:
  (i) a cyclic diorganosiloxane oligomer represented by the general formula $$[—SiR_2—O—]_x,$$

in which R has the same meaning as defined above and the subscript x is a positive integer in the range from 3 to 6,
  (ii) a diorganosiloxane oligomer of a linear molecular structure represented by the general formula $$R^1—SiR_2—O—(—SiR_2—O—)_y—SiR_2—R^1,$$

in which R has the same meaning as defined above, $R^1$ is a hydroxy group or a hydrolyzable group and the subscript y is a positive integer, and
  (iii) a mixture thereof;
(b) heating the reaction mixture in the presence of water to effect the siloxane rearrangement reaction under a controlled pressure of water vapor until an equilibrium is established; and
(c) neutralizing the alkaline compound with a neutralizing agent under the controlled pressure of water vapor, wherein the heating temperature in step (b) is in the range of from 50°–250° C., and the pressure of water vapor is controlled in the range of from 200 Torr to 7355 Torr.

2. The method for the preparation of a diorganopolysiloxane terminated at each molecular chain end with a silanolic hydroxy group as claimed in claim 1 in which alkaline compound added as a catalyst is a hydroxide or silanolate of sodium or potassium.

3. The method for the preparation of a diorganopolysiloxane terminated at each molecular chain end with a silanolic hydroxy group as claimed in claim 1 in which the amount of the alkaline compound added as a catalyst is in the range from 50 to 500 ppm by weight based on the amount of the diorganosiloxane oligomer.

4. The method for the preparation of a diorganopolysiloxane terminated at each molecular chain end with a silanolic hydroxy group as claimed in claim 1, wherein the starting material comprises the diorganosiloxane oligomer of a linear molecular structure, of which at least a part of the groups denoted by $R^1$ are hydrolyzable groups, and further comprising, prior to step (b), heating the reaction mixture in the presence of water so as to effect hydrolysis of the hydrolyzable groups denoted by $R^1$ to form a hydrolysis product and the hydrolysis product is removed from the reaction mixture as being carried by the water vapor.

5. A method for the preparation of a diorganopolysiloxane terminated at each molecular chain end with a silanolic hydroxy group as claimed in claim 1, wherein the heating temperature in step (b) is 150°–200° C.

6. A method for the preparation of a diorganopolysiloxane terminated at each molecular chain end with a silanolic hydroxy group as claimed in claim 4, wherein the hydrolysis product is at least 15% by weight based on the total amount of diorganosiloxane starting material.

7. A method for the preparation of a diorganopolysiloxane terminated at each molecular chain end with a silanolic hydroxy group as claimed in claim 1, wherein the diorganosiloxane oligomers do not require initial drying before polymerization.

8. A method for the preparation of a diorganopolysiloxane terminated at each molecular chain end with a silanolic hydroxy group as claimed in claim 1, wherein the starting material is a diorganosiloxane oligomer of a linear structure.

9. A method for the preparation of a diorganopolysiloxane terminated at each molecular chain end with a silanolic hydroxy group as claimed in claim 1, wherein the starting material is a mixture of cyclic diorganosiloxane oligomer and diorganopolysiloxane oligomer of a linear structure.

10. A method for the preparation of a diorganopolysiloxane terminated at each molecular chain end with a silanolic hydroxy group represented by the general formula $$HO-SiR_2-O-(-SiR_2-O-)_n-SiR_2-OH,$$

in which R is an unsubstituted or substituted monovalent hydrocarbon group and the subscript n is a positive integer, which comprises the steps of:
(a) adding an alkaline compound as a catalyst to starting materials to form a reaction mixture, said starting material being selected from the group consisting of:
 (i) a cyclic diorganosiloxane oligomer represented by the general formula $$[-SiR_2-O-]_x,$$

in which R has the same meaning as defined above and the subscript x is a positive integer in the range from 3 to 6,
 (ii) a diorganosiloxane oligomer of a linear molecular structure represented by the general formula $$R^1-SiR_2-O-(-SiR_2-O-)_y-SiR_2-R^1,$$

in which R has the same meaning as defined above, $R^1$ is a hydroxy group or a hydrolyzable group and the subscript y is a positive integer, and
 (iii) a mixture thereof;
(b) heating the reaction mixture in the presence of water to effect the siloxane rearrangement reaction under a controlled pressure of water vapor until an equilibrium is established, whereby said water vapor pressure is controlled by increasing the water vapor pressure above said reaction mixture; and
(c) neutralizing the alkaline compound with a neutralizing agent under the controlled pressure of water vapor.

* * * * *